(12) United States Patent
Kang et al.

(10) Patent No.: US 9,878,683 B2
(45) Date of Patent: Jan. 30, 2018

(54) MAINTAINING TELEMATICS SERVICE AFTER VEHICLE POWER DISRUPTION

(71) Applicant: Verizon Patent and Licensing Inc., Arlington, VA (US)

(72) Inventors: Gyeong S. Kang, Marietta, GA (US); Herman Bryant Elliott, Marietta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/048,885

(22) Filed: Feb. 19, 2016

(65) Prior Publication Data
US 2017/0240126 A1    Aug. 24, 2017

(51) Int. Cl.
| | |
|---|---|
| *B60R 16/033* | (2006.01) |
| *G07C 5/00* | (2006.01) |
| *B60R 16/03* | (2006.01) |
| *H01R 31/06* | (2006.01) |
| *H02J 9/06* | (2006.01) |

(52) U.S. Cl.
CPC ............ *B60R 16/033* (2013.01); *B60R 16/03* (2013.01); *G07C 5/008* (2013.01); *H01R 31/065* (2013.01); *H02J 9/061* (2013.01); *H01R 2201/26* (2013.01)

(58) Field of Classification Search
CPC ........................ B60R 16/033; H01R 31/065; H01R 2201/26; H02J 9/061; H04M 2250/02; B60L 1/006; G06F 1/263; G06F 1/28; G06F 1/30; G06F 1/305; G07C 5/008
See application file for complete search history.

(56) References Cited

U.S. PATENT DOCUMENTS

| | | | | |
|---|---|---|---|---|
| 4,937,528 | A | * | 6/1990 | Palanisamy ........ G01R 31/3648 320/132 |
| 6,424,157 | B1 | * | 7/2002 | Gollomp .............. G01R 31/006 320/132 |

(Continued)

OTHER PUBLICATIONS

Wikipedia article, "On-board diagnostics", Old revision dated Feb. 11, 2016, 16 pages.*

*Primary Examiner* — Behrang Badii
*Assistant Examiner* — David A Testardi (57) ABSTRACT

An electronic device including a first connector adapted to couple the electronic device to a vehicle diagnostic connector, wherein the first connector includes first electrical contacts arranged according to a first pin arrangement, and the electronic device is configured to obtain operating power for the electronic device via the first connector; a second connector including second electrical contacts arranged according to the first pin arrangement, wherein the second connector is configured to supply operating power for a telematics device coupled to the second connector, and the electronic device is configured to convey a communication signal between one of the first electrical contacts and a respective one of the second electrical contacts; an energy storage unit adapted to provide stored power as operating power for the electronic device and the telematics device; and a first processor configured to detect a loss of power from the first connector, and in response to detecting the loss of power, transmit an indication message indicating the loss of power to the telematics device while power is provided from the energy storage unit to the second connector.

8 Claims, 6 Drawing Sheets

(56) References Cited

U.S. PATENT DOCUMENTS

| | | | | |
|---|---|---|---|---|
| 6,636,790 B1* | 10/2003 | Lightner | ............. | G01M 15/102 701/31.4 |
| 6,957,133 B1* | 10/2005 | Hunt | ............. | B60R 25/102 701/32.4 |
| 7,317,298 B1* | 1/2008 | Burns | ............. | H01M 10/48 320/107 |
| 9,660,331 B2* | 5/2017 | Babbitt | ............. | H01Q 1/3233 |
| 2003/0085621 A1* | 5/2003 | Potega | ............. | B60L 11/185 307/18 |
| 2006/0036355 A1* | 2/2006 | Schaar | ............. | H02J 9/06 701/1 |
| 2008/0079551 A1* | 4/2008 | Blanchet | ............. | B60R 25/1004 340/426.1 |
| 2009/0112394 A1* | 4/2009 | Lepejian | ............. | G07C 5/0808 701/29.5 |
| 2009/0187781 A1* | 7/2009 | Gronemeier | ............. | G06F 1/305 713/340 |
| 2010/0010705 A1* | 1/2010 | Duddle | ............. | G07C 5/085 701/31.4 |
| 2011/0009107 A1* | 1/2011 | Guba | ............. | G08G 1/20 455/418 |
| 2011/0054732 A1* | 3/2011 | Jardine | ............. | H01R 13/665 701/31.4 |
| 2011/0112717 A1* | 5/2011 | Resner | ............. | G07C 5/008 701/31.4 |
| 2011/0313593 A1* | 12/2011 | Cohen | ............. | G01S 5/0027 701/2 |
| 2012/0203441 A1* | 8/2012 | Higgins | ............. | G07C 5/0858 701/102 |
| 2013/0268156 A1* | 10/2013 | Schumann | ............. | G07C 5/085 701/31.4 |
| 2014/0067491 A1* | 3/2014 | James | ............. | G06Q 50/30 705/13 |
| 2014/0277917 A1* | 9/2014 | Banet | ............. | G07C 5/00 701/31.5 |
| 2015/0073647 A1* | 3/2015 | Ubik | ............. | G07C 5/0808 701/29.1 |
| 2015/0105967 A1* | 4/2015 | Skipp | ............. | G07C 5/008 701/31.4 |
| 2016/0084657 A1* | 3/2016 | Schilling | ............. | G01C 21/20 701/29.1 |
| 2016/0093216 A1* | 3/2016 | Lee | ............. | H04W 4/046 340/870.11 |

* cited by examiner

MAINTAINING TELEMATICS SERVICE AFTER VEHICLE POWER DISRUPTION

BACKGROUND

Embodiments of the present disclosure relate generally to vehicle telematics. More specifically, embodiments relate to telematics systems that collect, process, and transmit diagnostic information collected from a vehicle.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
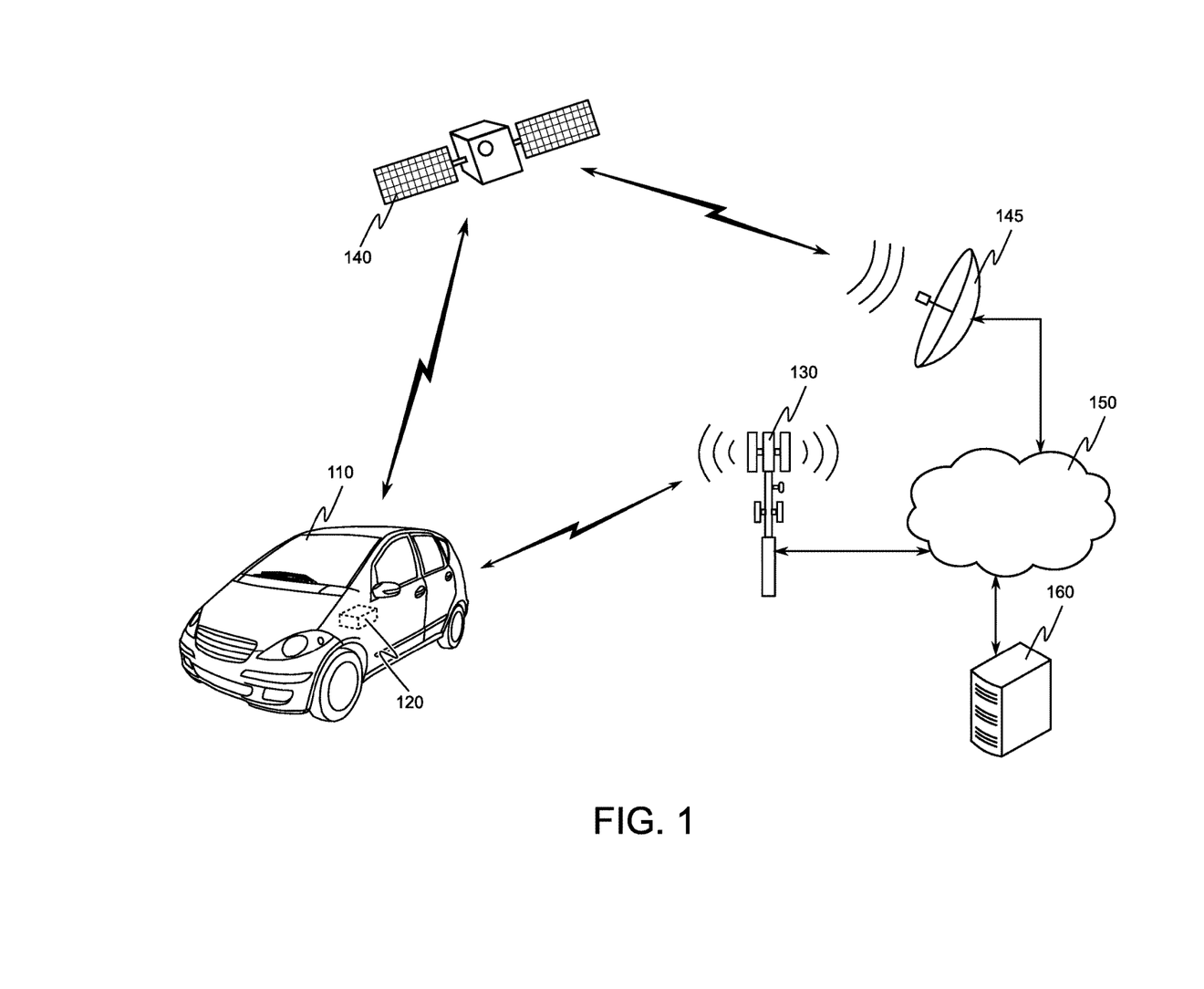
FIG. 1 illustrates an example of a system for monitoring a vehicle 110.

FIG. 1 illustrates an example of a system for monitoring a vehicle 110. Vehicle 110 may be, for example, a car, truck, watercraft, or aircraft, and may be owned and operated by an individual or as part of a fleet of vehicles managed and/or operated by an organization. Telematics system 120 is configured to connect to and communicate with an on-board diagnostics (OBD) system (or "vehicle diagnostic system") included in vehicle 110. The term "On-Board Diagnostics" (OBD) refers to a computer-based monitoring system built into vehicles, which may provide self-diagnostic and/or reporting capabilities. For example, in the United States, light-duty automobiles and trucks beginning with model year 1996 include an on-board diagnostic (OBD-II) system and an associated standardized J1962 16-contact OBD-II vehicle diagnostic connector that typically lies underneath a vehicle's dashboard, as mandated by the Environmental Protection Agency (EPA). OBD-II systems typically operate under one of the following communication protocols: J1850 VPW (Ford); J1850 VPWM (General Motors); ISO 9141-2 (most Japanese and European vehicles); Keyword 2000 (some Mercedes and Hyundai vehicles); and CAN (a newer protocol used by many vehicles manufactured after 2004). Heavy-duty trucks typically include an on-board diagnostic system which is analogous to the OBD-II systems present in light-duty vehicles. Such on-board diagnostic systems typically utilize a communication protocol called J1708/J1587 or J1939 that collects diagnostic information from sensors distributed in the truck, processes this information, and then makes it available through a standardized 6 or 9-pin vehicle diagnostic connector which is usually located in the truck's interior. Telematics system 120 may be configured to interface with the above examples of on-board diagnostic systems, as well as other on-board diagnostic systems.

OBD systems monitor sensors distributed throughout the vehicle's electrical, mechanical, and emissions systems and generate data that are processed by a vehicle's engine control unit (ECU) to detect malfunctions or deterioration in performance. The data typically include parameters such as vehicle speed (VSS), engine speed (RPM), engine load (LOAD), and mass air flow (MAF). The ECU can also generate diagnostic trouble codes (DTCs), which are 5-digit codes (for example, "P0001") indicating electrical or mechanical problems with the vehicle. Telematics system 120 is adapted to connect to and communicate via a standardized vehicle diagnostic connector with the vehicle's ECU or other elements of the OBD system to receive vehicle diagnostic information relating to the operation of the vehicle.

Telematics system 120 is configured to collect, process, and transmit vehicle diagnostic information to monitoring server 160. A variety of wireless networks can be used to transmit the vehicle diagnostic information to monitoring server 160. For example, telematics system 120 may include a wireless terrestrial modem allowing it to communicate via terrestrial communication network 130, which conveys the diagnostic information to monitoring server 160 via wide area network 150, such as the Internet. Terrestrial networks, i.e. networks with terrestrial base stations or transmitting towers, include CDMA networks (managed by Sprint and Verizon), GSM/GPRS networks (ATT, T-Mobile), Mobitex (Cingular), DataTac (Motient), and Reflex (Arch Pagenet, Weblink Wireless). Such terrestrial networks typically have good coverage within a given country's major population centers, but poor coverage in rural, un-populated areas. Also, individual terrestrial networks typically do not offer coverage in multiple countries. Telematics system 120 may include a satellite data modem allowing it to communicate via communication satellite 140, which relays the diagnostic information to ground station 145, which conveys the diagnostic information to monitoring server 160 via wide area network 150. Satellite networks (managed, e.g., by Orbcomm or Globalstar) typically transmit data with lower bandwidth and higher costs compared to terrestrial networks, but offer near-worldwide coverage. Telematics system 120 may be configured to dynamically switch between use of terrestrial- or satellite-based communications, based on, for example, whether terrestrial-based communication is sufficient for conveying diagnostic information to monitoring server 160. Monitoring server 160 may be configured to store the received vehicle diagnostic information for subsequent retrieval and processing.

Figure 2A:
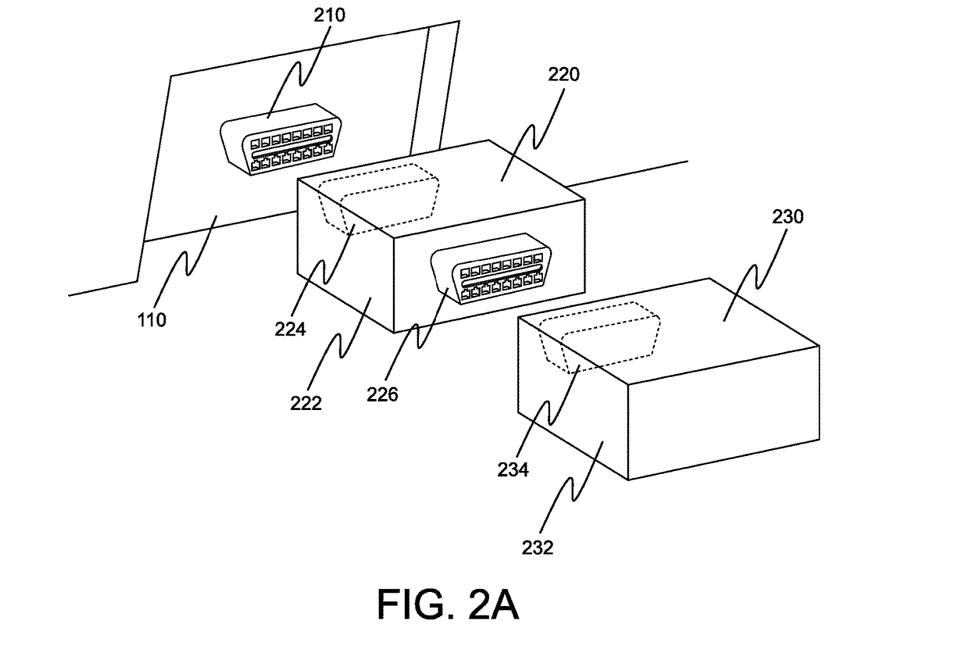
FIGS. 2A-2C illustrate various examples of telematics systems.
Figure 2B:
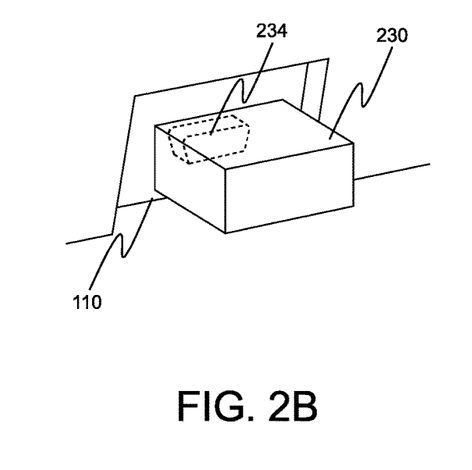
Figure 2C:
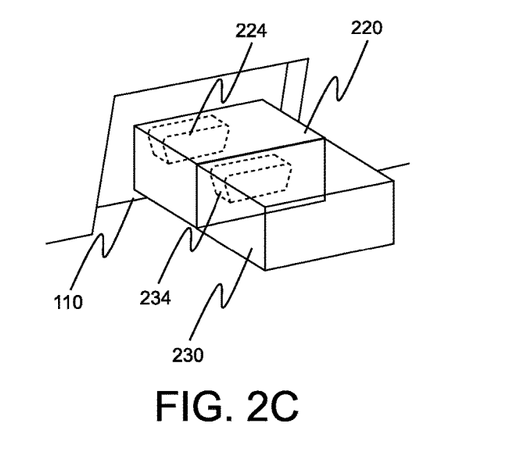

FIGS. 2A-2C illustrate various examples of telematics systems. FIG. 2A illustrates elements of a telematics system including a first telematics device 220 and a second telematics device 230. The dimensions, relative sizes, and packaging illustrated in FIGS. 2A-2C for first telematics device 220 and second telematics device 230 are merely examples, and other dimensions, relative sizes, and packaging may also be used. Much as discussed above, vehicle 110 includes a vehicle diagnostic connector 210. In the particular example illustrated in FIG. 2A, vehicle diagnostic connector 210 is a standard J1962 Type A 16-contact female OBD-II connector, although different connectors may be provided or included in other examples. Via electrical contacts included in vehicle diagnostic connector 210, an electronic device, such as first telematics device 220 and/or second telematics device 230, may obtain operating power as well as communicate with a vehicle diagnostic system made available via an OBD communication bus exposed by vehicle diagnostic connector 210.

First telematics device 220 is an electronic device including a housing 222, a first connector 224 projecting through housing 222, and a second connector 226 projecting through housing 222. In the particular example illustrated in FIG. 2A, first connector 224 and second connector 226 are positioned on opposite ends or sides of first telematics device 220, although connectors 224 and 226 may be positioned differently in other examples. First connector 224 is adapted to connect to vehicle diagnostic connector 210, includes contacts to obtain operating power for first telematics device 220 from vehicle diagnostic connector 210, and includes contacts for communication with the vehicle diagnostic system. In the particular example illustrated in FIG. 2A, first connector 224 is a standard J1962 Type A 16-contact male OBD-II connector, although different connectors may be provided or included in other examples. Second connector 226 is adapted to connect to connector 234 included in second telematics device 230. In the particular example illustrated in FIG. 2A, second connector 224 is a standard J1962 Type A 16-contact female OBD-II connector, although different connectors may be provided or included in other examples.

Second telematics device 230 is an electronic device including a housing 232 and a connector 234 projecting through housing 232. Connector 234 is adapted to connect to the second connector 226 of first telematics device 220, includes contacts to obtain operating power for first telematics device 230 from the second connector 226 of first telematics device 220, and includes contacts for communication with the vehicle diagnostic system via contacts included in the second connector 226 of first telematics device 220. In the particular example illustrated in FIG. 2A, connector 234 is a standard J1962 Type A 16-contact male OBD-II connector, although different connectors may be provided or included in other examples. Examples of telematics devices are discussed in U.S. Pat. No. 8,527,135, issued on Sep. 3, 2013, U.S. Pat. No. 7,778,752, issued on Aug. 17, 2010, U.S. Pat. No. 8,452,486, issued on May 28, 2013, each of which is incorporated by reference herein in its entirety, and elements and features described therein may be included in second telematics device 230.

In some examples, vehicle diagnostic connector 210 and second connector 226 may have the same form factor and pin arrangements; for example, in the particular example illustrated FIG. 2A, both vehicle diagnostic connector 210 and second connector 226 are standard J1962 Type A 16-contact female OBD-II connectors, with contacts that are used by second telematics device 230 arranged on the same pins. In such examples, first connector 224 and second connector 226 of first telematics device 220 would have the same pin arrangements, at least with respect to pins utilized by second telematics device 230. In such examples, the connector 234 of the second telematics device 230 would both be adapted to connect to vehicle diagnostic connector 210, as illustrated in FIG. 2B (in which second telematics device 230 alone may function as a telematics system), as well as adapted to connect to the second connector 226 of the first telematics device 220 while first telematics device 220 is connected to the vehicle diagnostic connector 210, as illustrated in FIG. 2C (in which first telematics device 220 and second telematics device 230 may function as a single telematics system). However, it is not required that vehicle diagnostic connector 210 and second connector 226 have the same form factor and/or gender. The examples illustrated in FIGS. 2B and 2C may be modified by the use of a cable connecting vehicle diagnostic connector 210 to first connector 224 of first telematics device 220 and/or a cable connecting second connector 226 to connector 234 of second telematics device 230, in order to more conveniently position and secure first telematics device 220 and/or second telematics device 230 within vehicle 110, such as below a dashboard or console.

Figure 3:
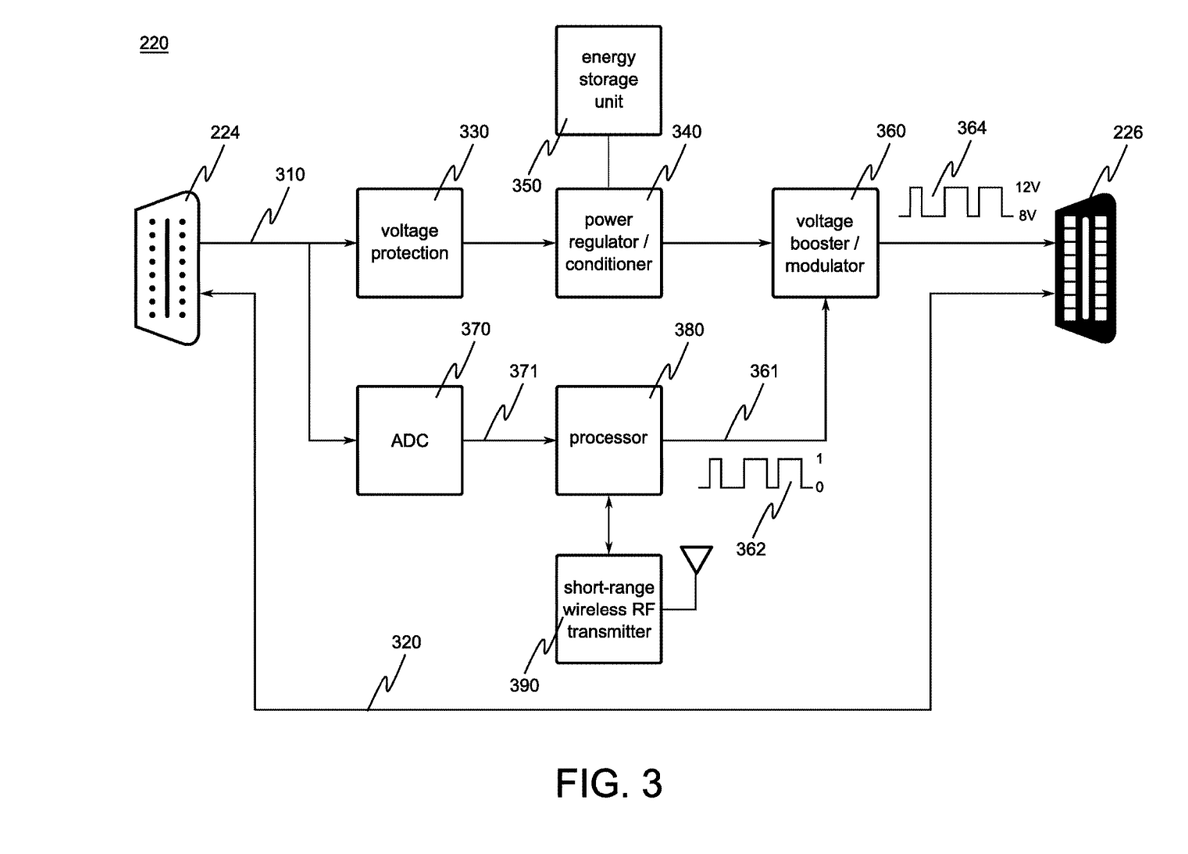
FIG. 3 illustrates a block diagram of components which may be included in a first telematics device.

FIG. 3 illustrates a block diagram of components which may be included in first telematics device 220. The illustrated elements 330, 340, 350, 360, 370, 380, and 390 are disposed within housing 222. As noted with respect to FIG. 2A, first telematics device 220 includes first connector 224, which is adapted to be connected to a vehicle diagnostic connector, such as vehicle diagnostic connector 210 illustrated in FIG. 2A. Also, first telematics device 220 includes second connector 226, which is adapted to be connected to the connector 234 of second telematics device 230. In the particular example illustrated in FIG. 3, OBD system communication bus signal connections 320, such as, but not limited to, Signal Ground (OBD-II connector pin 5), J1850 Bus+(OBD-II connector pin 2), J1850 Bus–(OBD-II connector pin 10), CAN High (OBD-II connector pin 6), CAN Low (ODB-II connector pin 14), ISO 9141-2 K-Line (OBD-II connector pin 7), and/or ISO 9141-2 Low (OBD-II connector pin 15), are simply passed through between their corresponding contacts on first connector 224 and second connector 226, so as to allow a device connected to second connector 226, such as second telematics device 230, to obtain vehicle diagnostic information via a vehicle diagnostic connector, such as vehicle diagnostic connector 210, connected to first connector 224. In some examples, these signals may pass into or through active components, such as isolation or buffering elements. In some implementations, processor 380 may be configured to interact with an on-board diagnostic system via these signals.

First connector 224 also includes contacts for power signals 310, which provides operating power for first telematics device 220. In an example in which first connector 224 is a J1962 OBD-II connector, the power signals 310 may be obtained from Chassis Ground (ODB-II connector pin 4) and Battery Power (OBD-II connector pin 16). The power signals 310 are provided to both voltage protection unit 330 and analog-to-digital converter (ADC) 370. Voltage protection unit 330 protects first telematics unit 220 from under- and over-voltage conditions in the power received via power signals 310, by blocking or limiting power received via power signals 310 in the event of such conditions. In some examples, voltage protection unit 330 may not be included in first telematics device 220.

From voltage protection unit 330, power is provided to power regulator/conditioner 340. Although not shown in FIG. 3, power regulator/conditioner 340 provides operating power for other elements included in first telematics device 220, such as, but not limited to, ADC 370, processor 380, and short-range wireless unit 390. For example, power regulator/conditioner 340 might provide a regulated 3.3 VDC output for such elements. Additionally, power regulator/conditioner 340 is configured to provide power to, and/or receive power from, energy storage unit 350. Examples of energy storage unit 350 include, but are not limited to, a standard battery, a rechargeable battery (such as a lithium-ion battery), and a supercapacitor. In examples in which energy storage unit 350 is rechargeable, either power regulator/conditioner 340 or energy storage unit 350 may include the components needed to regulate power output by voltage protection unit 330 to an effective voltage for charging and/or control the charging process (such as avoiding overcharging a battery or supercapacitor element). In response to insufficient power being delivered to first telematics device 220 via first connector 224, first telematics device 220 is configured to automatically draw power from energy storage unit 350. In some examples, this may be controlled by power regulator/conditioner 340. In some examples, processor 380 may also be involved in controlling when power is drawn from energy storage unit 350.

Whether power is being obtained from power signals 310 and/or energy storage unit 350, power regulator/conditioner 340 provides power to voltage booster/modulator 360. Voltage booster/modulator 360 includes an upconverter than increases a voltage received from power regulator/conditioner 340 to a voltage level similar to voltage of power signals 310; for example, approximately 12 VDC or 24 VDC, although lower voltages may be utilized. In some examples, voltage booster/modulator 360 may not be included in first telematics device 220 (for example, second telematics device 230 may be configured to rely on first telematics device for voltage regulation for operating power). In some examples, voltage booster/modulator 360 may be configured to modulate the output voltage under control of control signals 361 received from processor 380. For example, voltage booster/modulator 360 might modulate its output power between 8 VDC and 12 VDC, as illustrated by modulated voltage waveform 364, although other voltages and intermediate voltages may be utilized and/or available. The power output by voltage booster/modulator 360 is output via second connector 226, and may be used to power a device connected to second connector 226, such as second telematics device 230.

One or more of power signals 310 is provided to a sampling input of ADC 370, which is used to determine a voltage or current level for the sampled power signals 310. ADC 370 may be provided by, for example, an ADC with a multi-bit output of a sampled voltage level, or may be provided by, for example, a voltage comparator which simply determines whether a sampled voltage is above or below a threshold voltage level. ADC 370 provides digital values 371 of voltage or current levels sampled for the operating power received via first connector 224. In some examples, ADC 370 may be integrated into processor 380.

Processor 380, which may be provided by, for example, a microcontroller or a mobile processor such as an ARM-based CPU, receives the digital values 371 from ADC 370. Processor 380 is configured to execute instructions which determine if the received digital values indicate a loss of operating power via first connector 224. For example, the determination may be based on one or more digital values being at or below a threshold value. Such loss of power events may occur when vehicle 110 becomes involved in an accident, as many vehicles are configured to automatically disconnect battery power in the event of an accident. In response to detecting a loss of power from the first connector 224, processor 380 is configured to, such as by executing associated instructions, transmit an indication message indicating the loss of power to second telematics device 230 while second telematics device 230 is connected to second connector 226. Also, during the loss of power, power provided by the energy storage unit 350 is provided to second connector 226, which provides a "last gasp" opportunity for second telematics device 230 to continue operating for a limited time and transmit additional information to monitoring server 160.

In some examples of first telematics device 220, the indication message may be transmitted by modulating the voltage output by voltage booster/modulator 360. This may be done by instructions executed by processor 380 which cause processor 380 to modulate control signals 361, as illustrated by modulated control signals waveform 362, which cause voltage booster/modulator 360 to modulate the voltage it outputs to second connector 226, as illustrated by modulated voltage waveform 364. The modulation may be performed according to a predetermined pattern, to allow second telematics device 230 to discriminate between noise in the supplied power and transmission of the indication message.

In some examples of first telematics device 220, the indication message may be transmitted by transmitting an RF message via a wireless RF transmitter. In such examples first telematics device 220 may include a short-range wireless RF transmitter 390 under control of processor 380 and configured to transmit RF messages to an RF receiver included in the second telematics device 230. Short-range wireless RF transmitter 390 may include, for example, a Bluetooth transceiver, a wifi transceiver, or a Zigbee transmitter or transceiver, although many other RF protocols and technologies are also suitable for conveying the indication message. Processor 380 may be configured to execute instructions which cause short-range wireless RF transmitter 390 to transmit the RF message to the second telematics device 230 to indicate a loss of power from vehicle 110.

Figure 4:
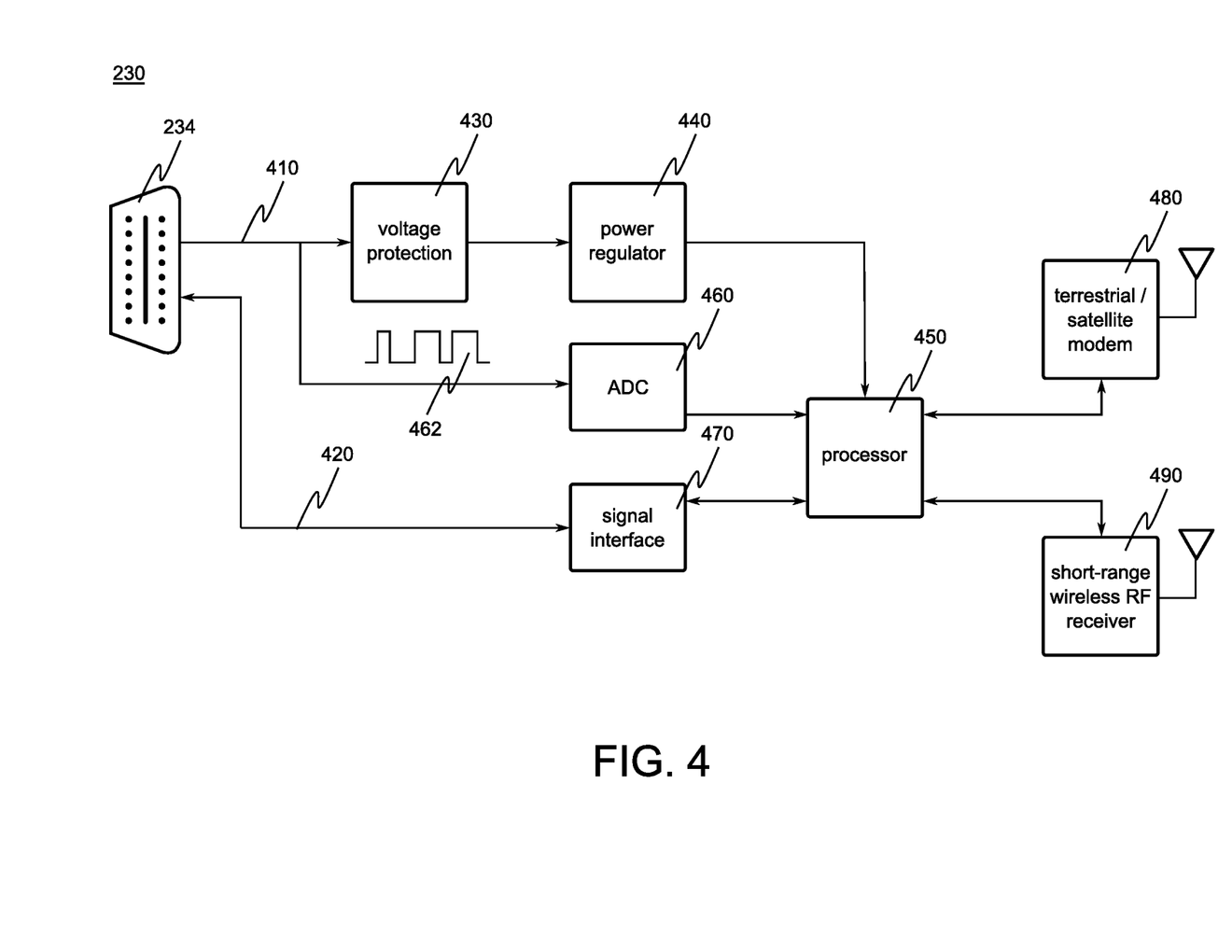
FIG. 4 illustrates a block diagram of components which may be included in a second telematics device.

FIG. 4 illustrates a block diagram of components which may be included in second telematics device 230 (which may also be referred to as a "telematics system 230"). The illustrated elements 430, 440, 450, 460, 470, 480, and 490 are disposed within housing 232. As noted with respect to FIG. 2A, second telematics device 230 includes connector 234, which is adapted to be connected to the second connector 236 of first telematics device 220, and may also be adapted to be connected to a vehicle diagnostic connector, such as vehicle diagnostic connector 210 illustrated in FIG. 2A. In the particular example illustrated in FIG. 4, OBD system communication bus signal connections 420, such as, but not limited to, Signal Ground (OBD-II connector pin 5), J1850 Bus+(OBD-II connector pin 2), J1850 Bus−(OBD-II connector pin 10), CAN High (OBD-II connector pin 6), CAN Low (ODB-II connector pin 14), ISO 9141-2 K-Line (OBD-II connector pin 7), and/or ISO 9141-2 Low (OBD-II connector pin 15), are passed between their corresponding contacts on connector 234 and signal interface 470. Signal interface 470 includes hardware elements that allow processor 450 to communicate with a vehicle diagnostic system according to the particular signaling conventions utilized by the vehicle diagnostic system. Such conventions include, but are not limited to SAE J1850 PWM (pulse width modulation), SAE J1850 VPW (variable pulse width), ISO9141-2, ISO14230-4 KWP (keyword protocol 2000), J2284/3, ISO15765-4 CAN (11- and 29-bit ID), and SAE J1939 CAN. Signal interface 470 may support multiple signal conventions to provide compatibility with a wider range of vehicle types.

Connector 234 also includes contacts for power signals 410, which provides operating power for second telematics device 230. In an example in which connector 234 is a J1962 OBD-II connector, the power signals 410 may be obtained from Chassis Ground (ODB-II connector pin 5) and Battery Power (OBD-II connector pin 16). The power signals 410 are provided to both voltage protection unit 430 and analog-to-digital converter (ADC) 460. Voltage protection unit 430 protects second telematics unit 230 in much the same manner that voltage protection unit 330 protects first telematics unit 220. In some examples, voltage protection unit 430 may not be included in second telematics device 230. Voltage protection unit 430 outputs power to power regulator 440, which downconverts the voltage it receives to a voltage or voltages suitable for providing operating power to other elements included in second telematics device 230, such as, but not limited to, ADC 460, signal interface 470, processor 450, terrestrial/satellite modem 480, and/or short-range wireless RF receiver 490. For example, power regulator 440 might provide a regulated 3.3 VDC output for such elements.

Processor 450, which may be provided by, for example, a microcontroller or a mobile processor such as an ARM-based CPU, is configured to interact with a vehicle diagnostic system via signal interface to collect and process vehicle diagnostic information. In response to various events, such as, but not limited to, particular contents of the collected diagnostic information or periodic timer events, processor 450 is configured to wirelessly transmit collected and/or processed diagnostic information to monitoring server 160 via terrestrial/satellite modem 480. In some examples, terrestrial/satellite modem 480 may be adapted to communicate via a terrestrial wireless communications network, examples of which are discussed above with respect to FIG. 1. For example, terrestrial/satellite modem 480 may include a cellular communication transmitter adapted to transmit data to a cellular communication network. In some examples, terrestrial/satellite modem 480 may be adapted to communicate via a space-borne communications satellite, such as satellite 140 illustrated in FIG. 1. In some examples, terrestrial/satellite modem 480 may be adapted to perform both terrestrial and satellite communications, with processor 450 configured to dynamically select between terrestrial or satellite communications depending on network conditions.

Processor 450 is further configured to receive and respond to indication messages transmitted by first telematics device 220. In an example in which such indication messages are transmitted via modulation of the voltage of operating power received via connector 234, second telematics device 230 may include ADC 460, which, much like ADC 370, is configured to sample a voltage supplied to ADC via power signals 410, and provide a digital value representative of the voltage to processor 450. Processor 450 is configured to obtain a plurality of such digital samples, and identify when a predetermined modulation pattern, such as modulation pattern 462, is presented via power signals 410, based on which processor 450 determines that the first telematics device 220 sent an indication message indicating that the first telematics device 220 experienced a loss of power from the vehicle diagnostic connector that first telematics device 220 is connected to. In an example in which such indication messages are transmitted via RF messages, second telematics device 230 may include short-range wireless RF receiver 490 which interfaces with processor 450. Short-range wireless RF receiver 490 may include, for example, a Bluetooth transceiver, a wifi transceiver, or a Zigbee transmitter or transceiver, although many other RF protocols and technologies are also suitable for conveying the indication message. Thus, via short-range wireless RF receiver 490, processor 450 may determine that the first telematics device 220 experienced a loss of power, and respond accordingly.

In response to determining an indication message has been transmitted by the first telematics device 220 indicating a loss of power, processor 450 may be configured to transmit a message based on collected and/or processed diagnostic information to monitoring server 160 via terrestrial/satellite modem 480. Additionally, processor 450 may be configured to transmit a message to monitoring server 160 indicating that the indication message was transmitted by the first telematics device 220 indicating a loss of power.

Figure 5:
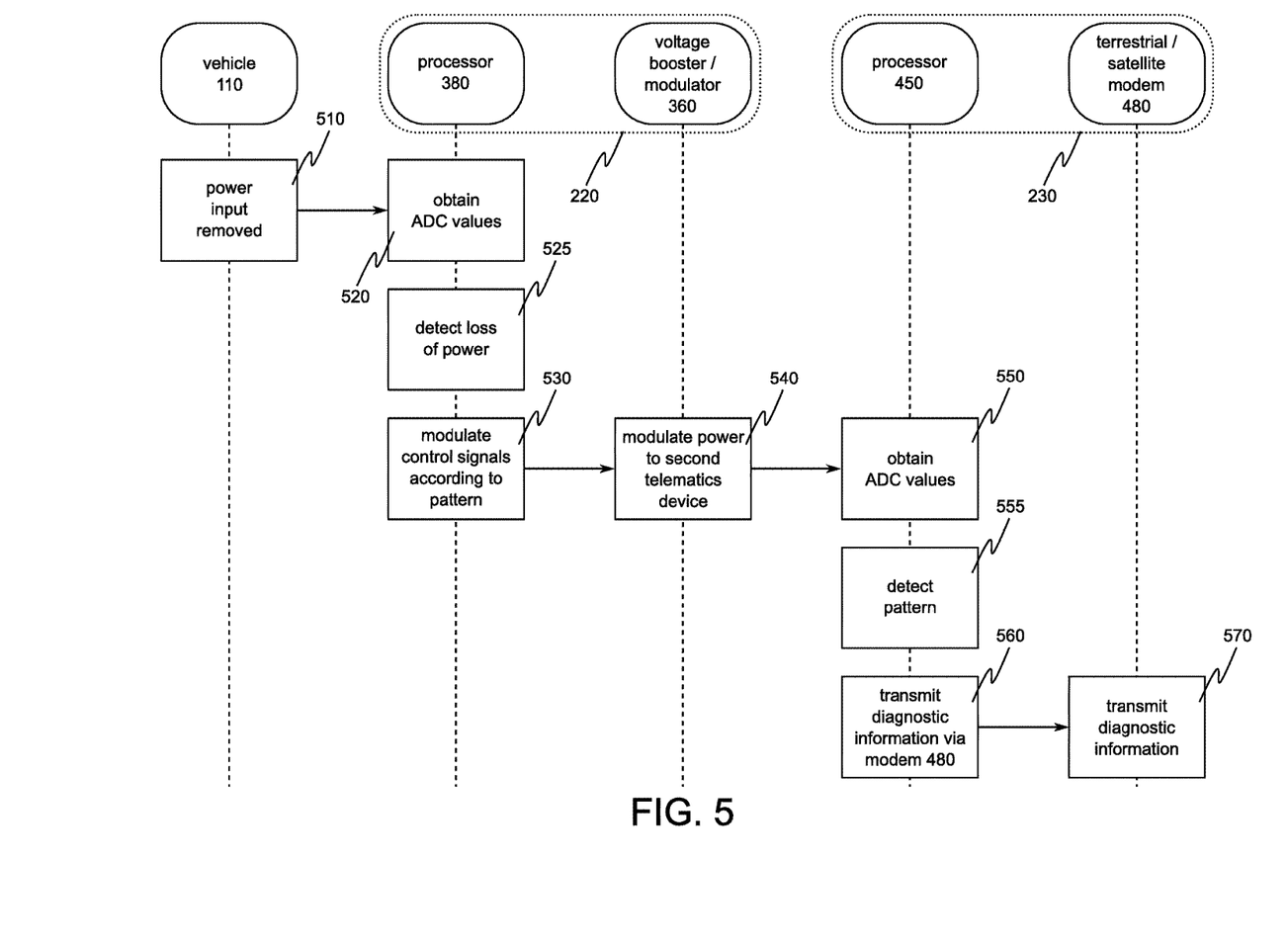
FIG. 5 illustrates an example of a process in which a first telematics device indicates to a second telematics device it has experienced a loss of power from a vehicle via modulation of power provided by the first telematics device to the second telematics device.

FIG. 5 illustrates an example of a process in which first telematics device 220 indicates to second telematics device 230 it has experienced a loss of power from vehicle 110 via modulation of power provided by the first telematics device 220 to the second telematics device 230. In this example, first telematics device 220 and second telematics device 230 are arranged and connected to provide the telematics system illustrated in FIG. 2C. At 510, vehicle 110 ceases supplying operating power to first telematics device 220. For example, vehicle 110 may have been involved in an accident resulting in battery power being disconnected from vehicle diagnostic port 210. In another example, first telematics device 220 may have been manually disconnected from vehicle diagnostic connector 210. In response to operating power no longer being received via first connector 224, first telematics device may automatically begin obtaining operating power from energy storage unit 350.

At 520, processor 380 obtains one or more ADC data values that indicate a voltage on power signals 410 is below a threshold value. Based on the obtained data values, at 525 processor 380 detects or determines that a loss of power has occurred at first connector 224. In response to the determination at 525, at 530 processor 380 begins modulating control signals 361 according to a predetermined pattern, such as according to the modulation waveform 362 illustrated in FIG. 3. At 540, voltage booster/modulator 360 responds to the modulation of control signals 361 by modulating the voltage of the power output via second connector 226 for second telematics device 230. For example, the voltage may be modulated between 8 VDC and 12 VDC as illustrated by waveform 364 in FIG. 3. As a result, first telematics device 220 transmits an indication message to second telematics device 230 that first telematics device 220 experienced a loss of power.

At 550, processor 450 obtains a plurality of digital values from ADC 460, representing a voltage on power signals 410 over time. Based on the obtained data values, at 555 processor 450 detects a predetermined pattern in the voltage of the operating power received via connector 234 and as a result determines that first telematics device 220 transmitted the indication message. At 560, in response to determining that first telematics device 220 transmitted the indication message, processor 450 sends the appropriate control signals to terrestrial/satellite modem 480 for diagnostic information collected and/or processed by processor 450 to be sent to monitoring server 160. At 570, the diagnostic data is transmitted wirelessly by terrestrial/satellite modem 480, and ultimately delivered to monitoring server 160.

Figure 6:
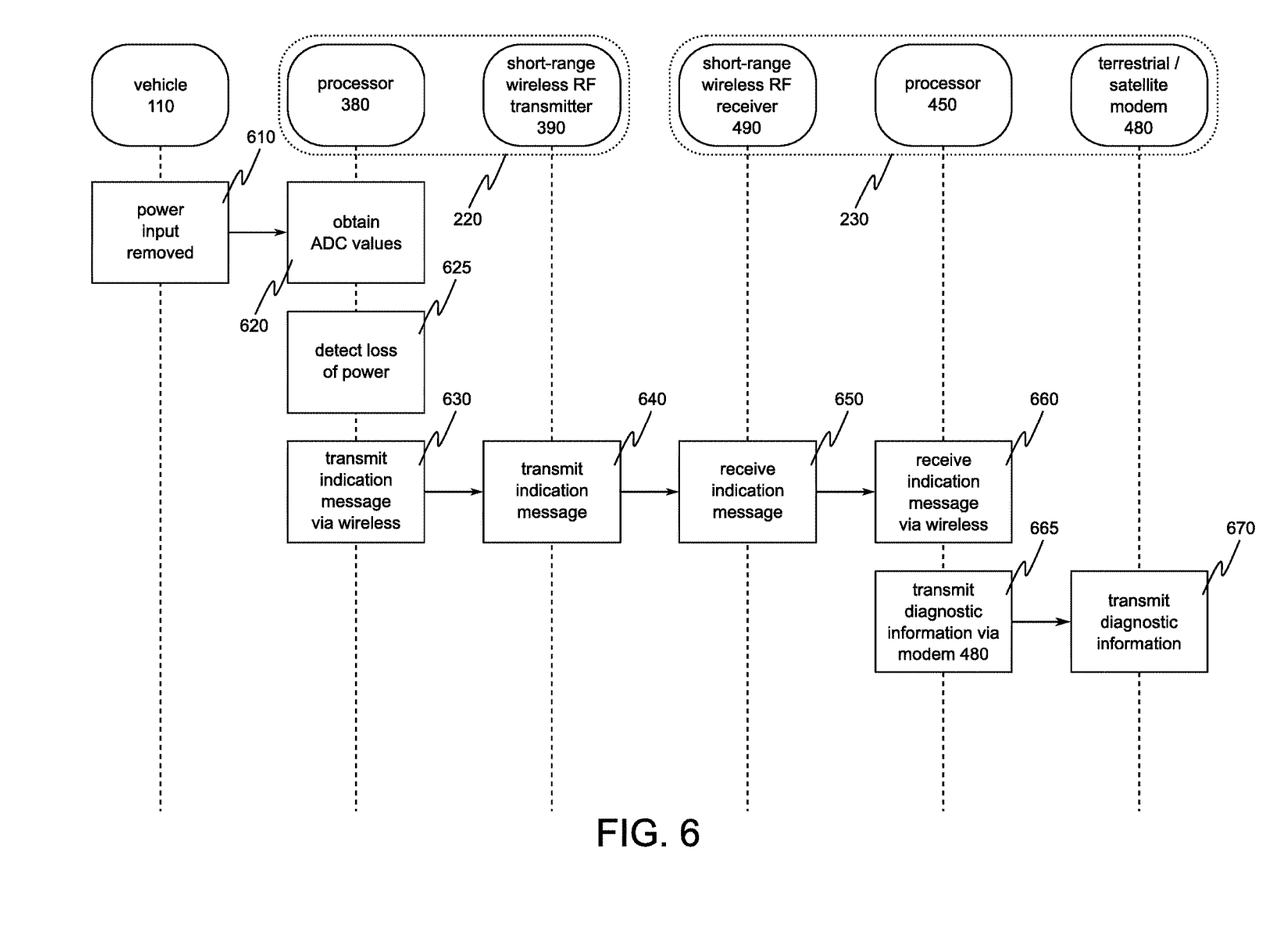
FIG. 6 illustrates an example of a process in which a first telematics device indicates to a second telematics device it has experienced a loss of power from a vehicle via an RF message sent from the first telematics device to the second telematics device.

FIG. 6 illustrates an example of a process in which first telematics device 220 indicates to second telematics device 230 it has experienced a loss of power from vehicle 110 via an RF message sent from the first telematics device 220 to the second telematics device 230. In this example, first telematics device 220 and second telematics device 230 are arranged and connected to provide the telematics system illustrated in FIG. 2C. At 610, vehicle 110 ceases supplying operating power to first telematics device 220. For example, vehicle 110 may have been involved in an accident resulting in battery power being disconnected from vehicle diagnostic port 210. In another example, first telematics device 220 may have been manually disconnected from vehicle diagnostic connector 210. In response to operating power no longer being received via first connector 224, first telematics device may automatically begin obtaining operating power from energy storage unit 350.

At 620, processor 380 obtains one or more ADC data values that indicate a voltage on power signals 410 is below a threshold value. Based on the obtained data values, at 625 processor 380 detects or determines that a loss of power has occurred at first connector 224. In response to the determination at 625, at 630 processor 380 sends the appropriate control signals to short-range wireless RF transmitter 390 to cause it to, at 640, transmit an indication message to second telematics device 230 indicating that first telematics device 220 experienced a loss of power.

At 650, short-range wireless RF receiver 490 receives the indication message transmitted at 640, and provides the indication message, or information regarding the information message, to processor 450 at 660. At 665, in response to determining that first telematics device 220 transmitted the indication message, processor 450 sends the appropriate control signals to terrestrial/satellite modem 480 for diagnostic information collected and/or processed by processor 450 to be sent to monitoring server 160. At 670, the diagnostic data is transmitted wirelessly by terrestrial/satellite modem 480, and ultimately delivered to monitoring server 160.

Some embodiments, or portions thereof, may be implemented in part or in whole as a hard-wired circuit, as a circuit configuration fabricated into an application-specific integrated circuit, or as a firmware program loaded into non-volatile storage, or a software program loaded from or into a data storage medium as machine-readable code. Such machine-readable code may include instructions executable by an array of logic elements, such as a microprocessor or other digital signal-processing unit.

It will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments is not limiting of the present invention. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with some of the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium at a later date. Such a medium may include any of the nontransitory forms listed above with respect to storage devices and may further include, for example, a carrier wave modulated, or otherwise manipulated, to convey instructions that can be read, demodulated/decoded and executed by a computer.

It can be appreciated, for example, that some process aspects described herein may be performed, in certain embodiments, using instructions stored on a computer-readable medium or media that direct a computer system to perform the process aspects. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

A "computer" or "computer system" may be, for example, a wireless or wireline variety of a microcomputer, minicomputer, laptop, personal data assistant (PDA), wireless e-mail device (e.g., BlackBerry), cellular phone, pager, processor, or any other programmable device, which devices may be capable of configuration for transmitting and receiving data over a network. Computer devices disclosed herein can include memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (electrically erasable PROM), and other computer-readable media.

It is to be understood that the figures and descriptions of the present invention have been simplified to illustrate elements that are relevant for a clear understanding of the present invention, while eliminating, for purposes of clarity, other elements. Those of ordinary skill in the art will recognize that these and other elements may be desirable. However, because such elements are well known in the art, and because they do not facilitate a better understanding of the present invention, a discussion of such elements is not provided herein.

In some embodiments of the present invention disclosed herein, a single component can be replaced by multiple components, and multiple components replaced by a single component, to perform a given function or functions. Except where such substitution would not be operative to practice embodiments of the present invention, such substitution is within the scope of the present invention.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An electronic device comprising:
   a first connector adapted to couple the electronic device to a vehicle diagnostic connector, wherein
      the first connector includes first electrical contacts arranged according to a first pin arrangement, and
      the electronic device is configured to obtain operating power for the electronic device via the first connector;
   a second connector including second electrical contacts arranged according to the first pin arrangement, wherein
      the second connector is configured to supply operating power for a telematics device coupled to the second connector, and
      the electronic device is configured to convey a communication signal between one of the first electrical contacts and a respective one of the second electrical contacts;
   an energy storage unit coupled to the first connector and the second connector;
   a voltage modulator adapted to vary a voltage of the operating power supplied to the telematics device in response to one or more control signals received from a first processor, the first processor being configured to detect a loss of power from the first connector,
   wherein in response to detecting the loss of power:
      the energy storage unit is configured to provide stored power to the electronic device and to the telematics device; and
      the processor is configured to transmit an indication message indicating the loss of power to the telematics device by modulating the control signals to cause the voltage modulator to vary the voltage according to a first pattern.

2. The electronic device of claim 1, further comprising:
   an RF (radio frequency) transmitter configured to transmit RF messages to the telematics device;
   wherein the first processor is further configured to transmit a second indication message by transmitting an RF message via the RF transmitter.

3. The electronic device of claim 2, wherein the RF transmitter is a Bluetooth transceiver.

4. The device of claim 1, wherein
   the first connector is a male OBD-II connector; and
   the second connector is a female OBD-II connector.

5. The electronic device of claim 1, further comprising:
   an ADC (analog-to-digital converter) configured to receive the operating power received via the first connector and provide a digital value of a voltage or current of the received operating power to the first processor;
   wherein the first processor is further configured to detect the loss of power based on the digital value provided by the ADC.

6. The electronic device of claim 1, wherein the energy storage unit includes a battery or a supercapacitor.

7. The electronic device of claim 6, wherein the energy storage unit is configured to store a charge received via power obtained via the first electrical contacts.

8. The electronic device of claim 1, further comprising:
   a first housing, wherein
      the energy storage unit and the first processor are disposed within the first housing, and
      the first connector and the second connector each project through the first housing;
   a second housing;
   a third connector projecting through the second housing and adapted to be coupled to the second connector;
   a cellular communication transmitter disposed in the second housing and adapted to transmit data to a cellular communication network; and
   a second processor disposed in the second housing and configured to:
      receive power via the third connector,
      receive vehicle diagnostic information via the third connector,
      determine when the indication message has been transmitted, and in response to determining that the indication message has been transmitted, transmit a message based on the vehicle diagnostic information via the cellular communication transmitter.

\* \* \* \* \*